United States Patent
Yu et al.

(10) Patent No.: US 7,178,962 B2
(45) Date of Patent: Feb. 20, 2007

(54) REFLECTING APPARATUS FOR BACKLIGHT MODULE OF FLAT PANEL DISPLAY

(75) Inventors: Hong-Tien Yu, Bade (TW); Jin-Jei Wu, Taipei (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 75 days.

(21) Appl. No.: 10/866,779

(22) Filed: Jun. 15, 2004

(65) Prior Publication Data
US 2005/0007756 A1   Jan. 13, 2005

(30) Foreign Application Priority Data
Jul. 9, 2003   (TW) ............................... 92118770 A

(51) Int. Cl.
*F21V 7/04* (2006.01)
(52) U.S. Cl. ............... 362/609; 362/600; 362/607; 362/26; 362/297
(58) Field of Classification Search ............ 362/609, 362/600, 607, 608, 26, 297, 346; 353/98, 353/99; 359/599, 707
See application file for complete search history.

(56) References Cited

U.S. PATENT DOCUMENTS

| 4,686,612 A | * | 8/1987 | Pringle et al. | 362/297 |
| 6,217,185 B1 | * | 4/2001 | Feger et al. | 362/628 |
| 6,554,440 B2 | * | 4/2003 | Umemoto | 362/610 |

* cited by examiner

*Primary Examiner*—Sandra O'Shea
*Assistant Examiner*—Mark Tsidulko
(74) *Attorney, Agent, or Firm*—Bacon & Thomas, PLLC

(57) ABSTRACT

A reflecting apparatus for a backlight module of a plane display is disclosed. The backlight module includes a light guide distal from the reflecting apparatus, and a plurality of diffusers. The apparatus comprises a light source, a reflector, and two substantially parallel sets of partially overlapped light deflectors wherein a gap exists between either two adjacent light deflectors of the same set or one light deflector and the reflector. A portion of emitted light is directed to the light guide after being reflected from the reflector. The remaining portion of light is directed to the light guide either after it has been deflected by the light deflectors or deflected by the light deflectors prior to being reflected by the reflector. Parallel light received at the light guide is deflected to the plane display as a backlight source of the plane display after passing the diffusers.

6 Claims, 4 Drawing Sheets

REFLECTING APPARATUS FOR BACKLIGHT MODULE OF FLAT PANEL DISPLAY

BACKGROUND OF THE INVENTION

1. Field of the Invention

The present invention relates to reflectors and, more particularly, to a reflecting apparatus of the backlight module for a plane display with improved characteristics.

2. Description of Related Art

Plane displays such as LCDs (liquid crystal displays), and the like have become the dominant type of displays in recent years due to their advantageous characteristics (e.g., lightweight, compactness, etc.)

A backlight module is typically mounted in the plane display as the light source of the display. With reference to FIG. 1, there is shown a conventional backlight module comprising a light source 60, a light guide 4, two diffusers 51 and 52, and a reflector 70 having a concave surface. Light is emitted from the light source. Next, light is directed to the light guide 4 after being reflected by the reflector. Next, light is deflected to the display after passing the diffusers 51, 52. Increasingly larger plane displays are becoming the dominant factor in the market. As such, additional light sources are required for enabling the display to have a sufficient and evenly-dispersed brightness. However, light is scattered and wasted during the reflection (i.e., low efficiency). Further, heat may accumulate excessively due to poor ventilation of the well-known arrangement. Also, the provision of additional light sources can consume electrical energy significantly. Hence, the conventional backlight module is not satisfactory for users of large plane displays.

Therefore, it is desirable to provide a reflecting apparatus for the backlight module of a plane display in order to mitigate and/or obviate the aforementioned problems.

SUMMARY OF THE INVENTION

An object of the present invention is to provide a reflecting apparatus, for reusing or collecting the scattered light to increase the intensity of reflected light, and to increase the efficiency of heat dissipation of the backlight module for preventing overheating of the light source.

The reflecting apparatus of the present invention is mounted in a backlight module of a plane display. The backlight module includes a light guide distal from the reflecting apparatus, and a plurality of diffusers. The reflecting apparatus includes a light source; a reflector having a concave surface and a focus on the light source; and two substantially parallel sets of a plurality of partially overlapped light deflectors at one side of the reflector wherein a gap for ventilation exists between either two adjacent light deflectors of the same set or one light deflector and the reflector. A portion of light emitted from the light source is directed to the light guide after being reflected from the reflector, the remaining portion of light is directed to the light guide either after it has been deflected by the light deflectors or deflected by the light deflectors prior to being reflected by the reflector, and parallel light received at the light guide is deflected to the plane display as a backlight source of the plane display after passing the diffusers. By utilizing the present invention, intensity and brightness of light received at the light guide is significantly intensified without adversely consuming electrical energy.

Other objects, advantages, and novel features of the invention will become more apparent from the detailed description when taken in conjunction with the accompanying drawings.

DETAILED DESCRIPTION OF THE PREFERRED EMBODIMENT

Figure 1:
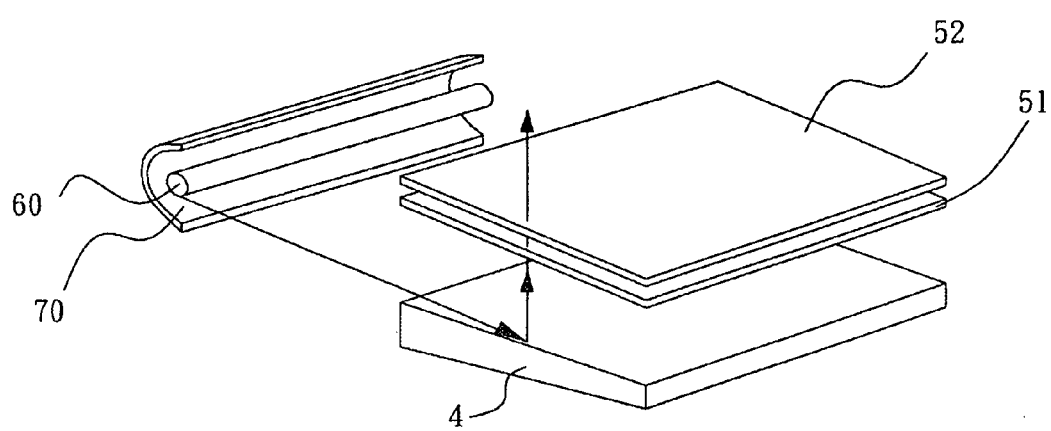
FIG. 1 is a schematic view of a conventional reflecting apparatus for the backlight module of a plane display.
Figure 2:
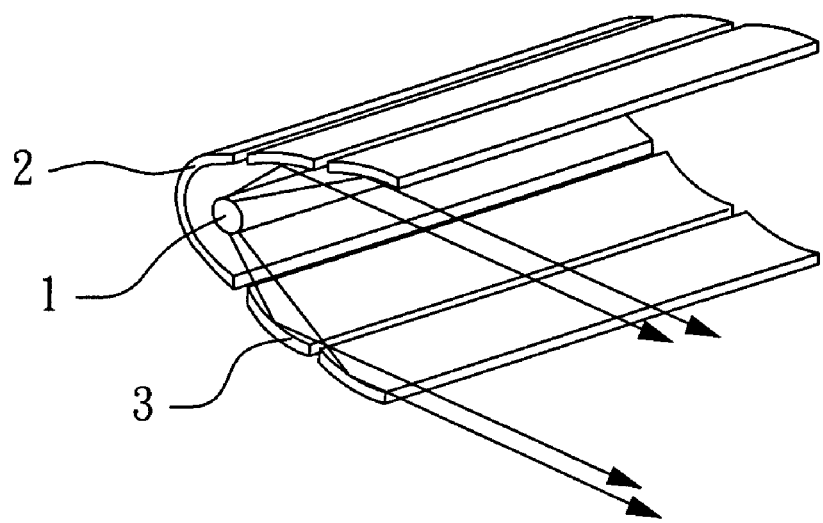
FIG. 2 is a schematic view of a first preferred embodiment of reflecting apparatus for the backlight module of a plane display according to the invention.
Figure 4:
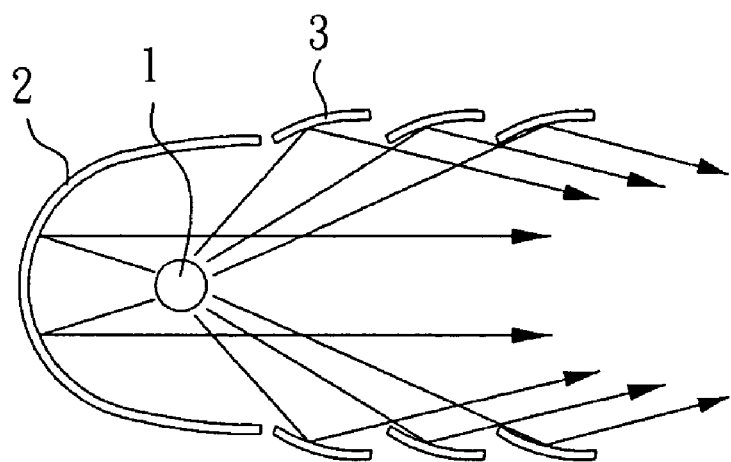
FIG. 4 is a sectional view of FIG. 2.

With reference to FIGS. 2 and 4, there is shown a reflecting apparatus for the backlight module of a plane display constructed in accordance with a first preferred embodiment of the invention. As shown, the reflecting apparatus comprises a cylindrical light source 1, a reflector 2 having a concave surface and a focus on the light source 1, and two substantially parallel sets of a plurality of light deflectors 3 disposed at one side of the reflector 2. A portion of light emitted from the light source 1 is substantially parallel directed to a distal light guide (not shown) after reflecting from the reflector 2. The remaining portion of light is also directed to the distal light guide after it has been deflected by the light deflectors 3 in which deflected light is substantially parallel from the light deflectors 3 belonging to the same set. One light deflector 3 is partially overlapped by one or two adjacent light deflectors 3 of the same set for preventing light from escaping. As a result, intensity and brightness of light received at the light guide is significantly intensified. Also, a gap exists between either two adjacent light deflectors 3 or one light deflector 3 and the edge of the reflector 2. The provision of gaps is to ensure adequate ventilation is provided and so overheating is prevented. Moreover, the light deflectors 3 of the same set are disposed slightly different to one another. Note that there is no restriction on the implementation of the light source 1. For example, the light source 1 can be implemented as either a CCFL (cold cathode fluorescent lamp) or LED (light emitting diode).

Figure 3:
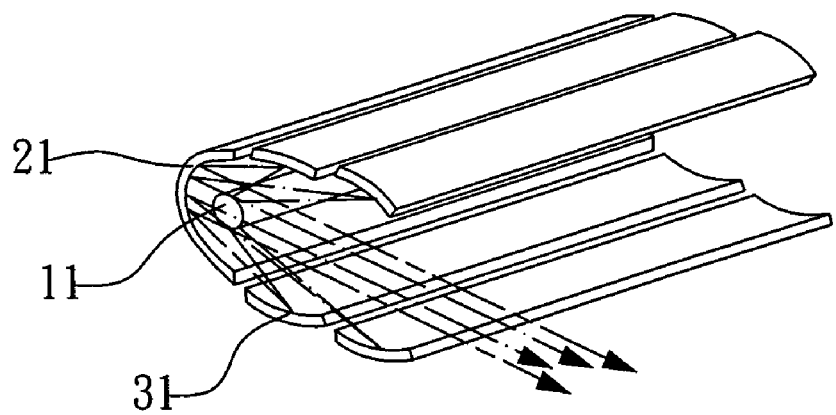
FIG. 3 is a schematic view of a second preferred embodiment of reflecting apparatus for the backlight module of a plane display according to the invention.
Figure 5:
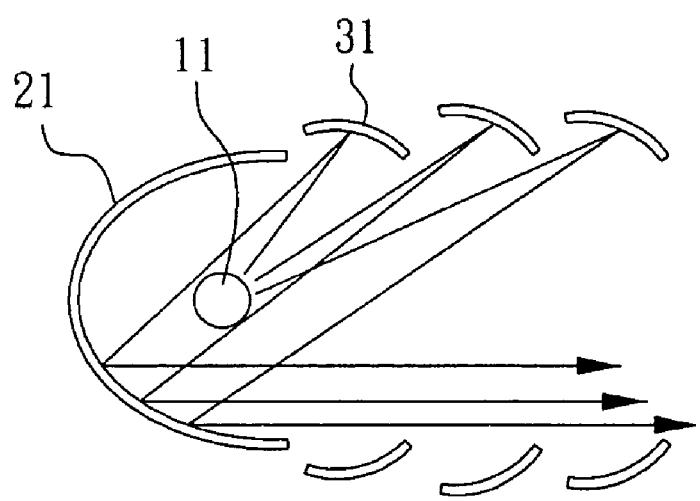
FIG. 5 is a sectional view of FIG. 3.

With reference to FIGS. 3 and 5, there is shown a reflecting apparatus for the backlight module of a plane display constructed in accordance with a second preferred embodiment of the invention. The second preferred embodiment substantially has the same structure as the first preferred embodiment. The difference between the first and the second preferred embodiments, i.e., the characteristic of the second preferred embodiment are detailed below. The remaining portion of light emitted from the light source 11 is substantially parallel directed to the distal light guide after it has been deflected by the light deflectors 31 and then reflected by the reflector 21.

Note that the section of the reflector 2 is a parabola. Also, the light deflector 3 can be implemented as either a concave mirror of a cone or that of a cylinder (as shown in both embodiments).

Figure 6:
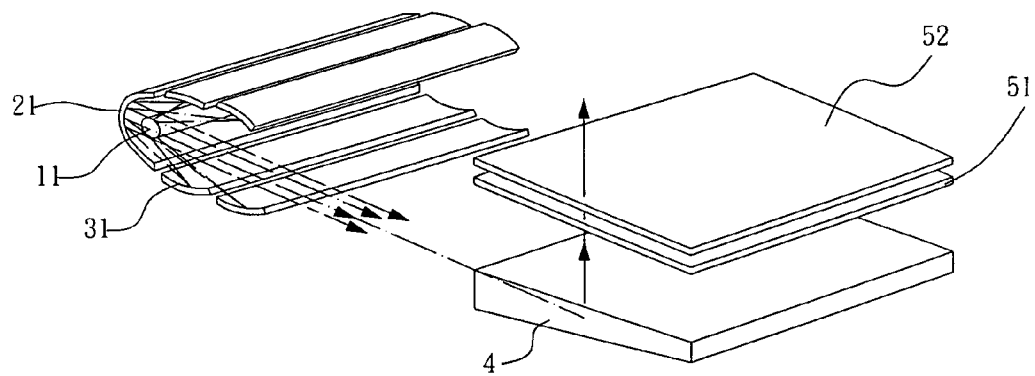
FIG. 6 is a schematic view of the backlight module incorporating the reflecting apparatus of the invention.

With reference to FIG. 6, there is shown the whole backlight module in which light is substantially parallel directed to the light guide 4 after being reflected from the reflecting apparatus. Next, light is deflected to the plane display (not shown) as a backlight source of the plane display after passing the diffusers 51, 52.

Although the present invention has been explained in relation to its preferred embodiment, it is to be understood that many other possible modifications and variations can be made without departing from the spirit and scope of the invention as hereinafter claimed.

What is claimed is:

1. A reflecting apparatus for backlight module of plane display, the backlight module including a light guide distal from the reflecting apparatus and a plurality of diffusers, said reflecting apparatus comprising:

a light source;

a reflector having a concave surface and a focus on the light source; and two substantially parallel sets of a plurality of light deflectors at one side of the reflector wherein a gap exists between either two adjacent light deflectors of the same set or one light deflector and the reflector, wherein light emitted by the light source is directed to the light guide after being reflected by the light reflector, wherein a portion of the light reflected by the light reflector is deflected by the light deflectors prior to being reflected by the reflector, and wherein light received at the light guide is deflected to the plane display as a backlight source of the plane display after passing the diffusers.

2. The reflecting apparatus as claimed in claim 1, wherein a cross section of the reflector is a parabola.

3. The reflecting apparatus as claimed in claim 1, wherein the light reflector is a concave mirror of either a cone or cylinder.

4. The reflecting apparatus as claimed in claim 1, wherein light is substantially parallel directed to the light guide.

5. The reflecting apparatus as claimed in claim 1, wherein each of the light deflectors is partially overlapped by one or two adjacent light deflectors of the same set.

6. The reflecting apparatus as claimed in claim 1, wherein the light source is a CCFL (cold cathode fluorescent lamp) or LED (light emitting diode).

* * * * *